United States Patent [19]

Chen et al.

[11] Patent Number: 4,559,233

[45] Date of Patent: Dec. 17, 1985

[54] EDIBLE FIBROUS SERUM MILK PROTEIN/XANTHAN GUM COMPLEXES

[75] Inventors: Wen-Sherng Chen, Glenview; William G. Soucie, Gurnee, both of Ill.

[73] Assignee: Kraft, Inc., Glenview, Ill.

[21] Appl. No.: 567,277

[22] Filed: Dec. 30, 1983

[51] Int. Cl.⁴ .............................................. A23J 3/00
[52] U.S. Cl. .................................. 426/104; 426/276; 426/574; 426/657; 426/658; 426/802
[58] Field of Search ............... 426/104, 574, 802, 656, 426/657, 658

[56] References Cited

U.S. PATENT DOCUMENTS

| | | | |
|---|---|---|---|
| 3,455,697 | 7/1969 | Atkinson | 426/802 X |
| 3,627,536 | 12/1971 | Arima et al. | 426/802 X |
| 3,645,746 | 2/1972 | Akinson | 426/802 X |
| 3,792,175 | 2/1974 | Schmitt | 426/656 |
| 3,806,611 | 4/1974 | Sawada et al. | 426/802 X |
| 3,829,587 | 8/1974 | Tolstoguzov et al. | 426/574 |
| 3,842,062 | 10/1974 | Eastman | 426/583 X |
| 4,173,657 | 11/1979 | Gaudio et al. | 426/574 |
| 4,423,083 | 12/1983 | Shenouda | 426/574 |

FOREIGN PATENT DOCUMENTS

| | | | |
|---|---|---|---|
| 995971 | 8/1976 | Canada. | |
| 886486 | 1/1962 | United Kingdom | 426/574 |

OTHER PUBLICATIONS

Smith, A. K., et al. "Recovery of Soybean Whey Protein with Edible Gums and Detergents", Agr. and Food Chem., vol. 10, No. 4, Jul.-Aug., 1962, pp. 302-304.

Primary Examiner—Robert Yoncoskie
Attorney, Agent, or Firm—Fitch, Even, Tabin & Flannery

[57] ABSTRACT

Methods and compositions relating to dairy whey protein-xanthan gum fibers and simulated meat products are disclosed.

11 Claims, 4 Drawing Figures

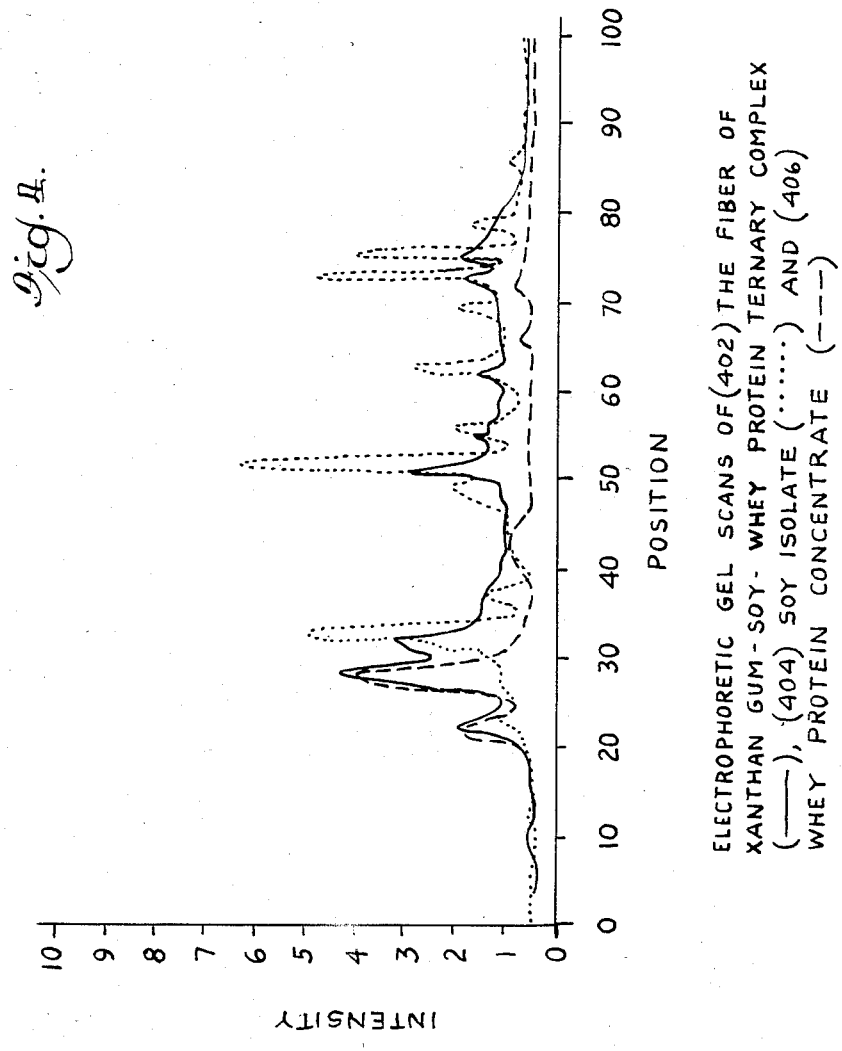

EDIBLE FIBROUS SERUM MILK PROTEIN/XANTHAN GUM COMPLEXES

The present invention is directed to edible fibrous protein compositions suitable for utilization as simulated meat products and to methods for preparing such compositions. This application is related to our contemporaneously executed and filed application entitled "Fibrous Protein Complexes", which is incorporated herein by reference.

Substantial technological effort has been directed to the preparation and utilization of edible synthetic protein fibers, particularly including synthetic protein fibers of vegetable origin such as soy protein fibers. In this regard, efforts to provide synthetic meat textures have conventionally included preparative methods comprising the extrusion or spinning of vegetable protein solutions or various protein-polysaccharide combinations to form meat-like fibers, such as described in U.S. Pat. Nos. 2,682,466, 3,093,483, 3,627,536 and 4,118,520.

Substantial effort has also been directed to the study of complexes of proteins with other polymeric components including various polysaccharides. For example, alginates have been complexed with proteins including casein, edestin, yeast protein, gelatin and soy protein. Gelatin, bovine serum albumin, lysozyme and soy proteins have been complexed with sodium dextran sulfate, sunflower seed albumin has been complexed with alginate or pectin, and whey protein has been recovered from whey through the use of various hydrocolloids. Soybean whey-gum fibers are also known, and it is also known that certain proteins will form fibers in the presence of specific polysaccharides, as disclosed in U.S. Pat. No. 3,792,175. However, such conventional procedures and fiber systems are limited in protein or gum utilization, and methods for providing novel protein complexes which may be utilized in the manufacture of quality simulated meat products would be desirable.

As reported in "Filaments From Proteins", M. P. Tombs, Plant Proteins, G. Norton, Butterworth, Boston (1978), pp. 283–288, the ideal filament forming process would probably be one where a solution of the protein, after minor manipulation, spontaneously separates to yield filaments, preferably in ordered arrays. However, there have been difficulties in providing such processes in which particular proteins available for filament production utilize self-assembly to form filaments.

Milk serum protein is a nutritionally desirable protein source which may typically be lost in cheese whey during cheese production. There is a need for methods which could utilize milk serum protein in the production of functionally and nutritionally desirable protein fibers useful in simulated meat products.

Accordingly, it is an object of the present invention to provide such methods for the manufacture of novel milk serum protein-complex fibers, which have desirable flavor and texture characteristics. It is a further object to provide novel fibrous meat-simulating compositions. These and other objects of the invention will become apparent from the following detailed description and the accompanying drawings of which FIG. 1 is a schematic diagram illustrating an embodiment of an xanthan gum/whey protein fiber manufacturing method;

FIG. 4 is an electrophoretic gel scan of a ternary complex of xanthan gum, soy isolate and whey protein concentrate, together with gel scans of the soy protein isolate and the whey protein concentrate components.

Figure 1:
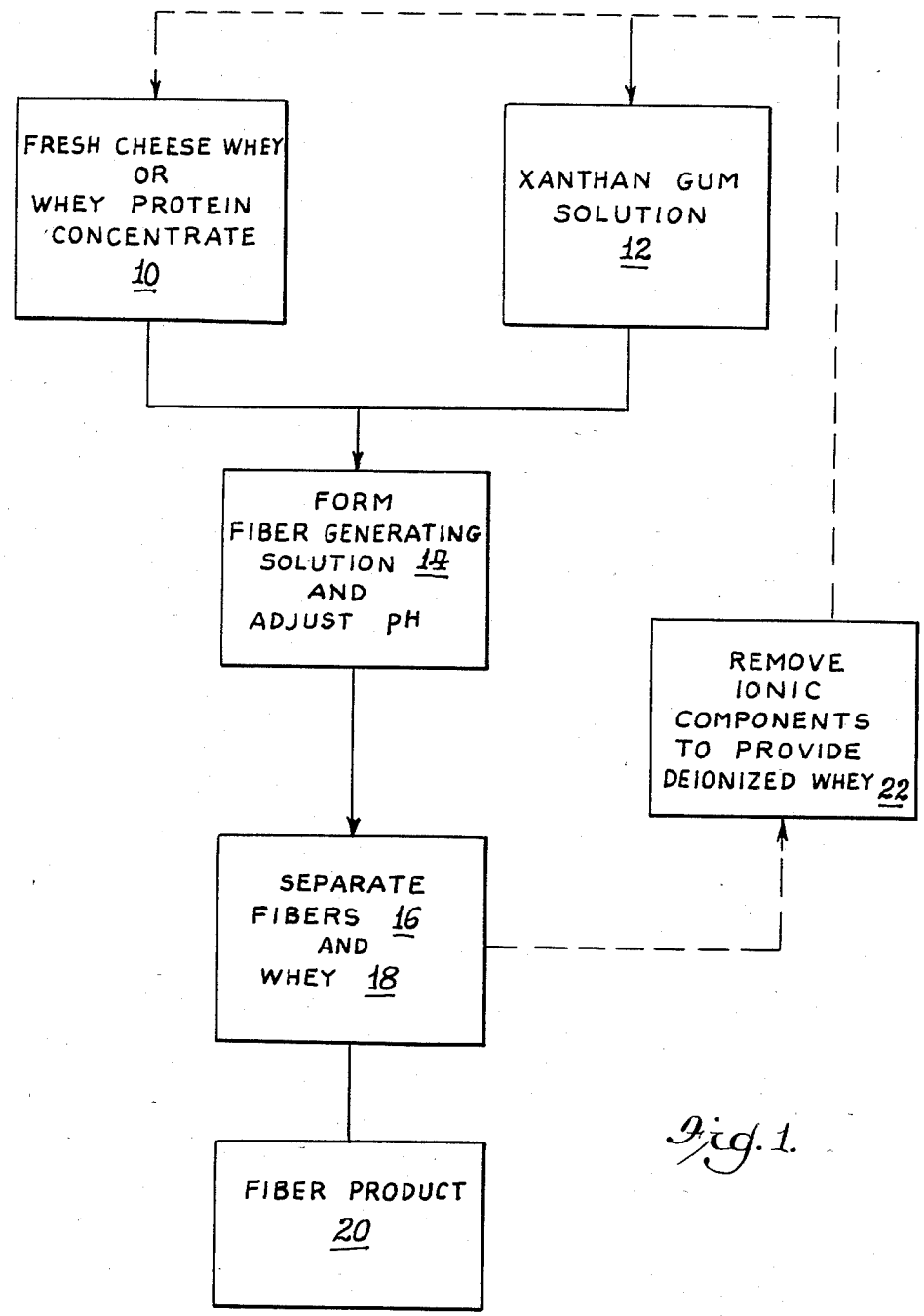

Generally, the present invention is directed to methods for manufacturing edible whey protein-xanthan gum complex fibers, and to specific whey protein-xanthan gum fiber compositions having meat-like body and texture. Various aspects of the invention are further directed to methods for stabilizing the integrity of such fibers, particularly in the presence of added flavoring agents which adversely affect the integrity of the fibers. Additional aspects of the disclosure are directed to meat simulating compositions including those having particularly desirable properties such as appearance and/or firmness levels simulating particular meat products.

In accordance with various aspects of the present invention, methods for edible whey protein fiber manufacture are provided comprising the steps of providing an aqueous protein fiber generating solution comprising a solubilized edible milk serum protein component (hereinafter referred to as "whey protein"), and a solubilized xanthan gum hydrocolloid polymer component selected from the group consisting of xanthan gum, xanthan gum/hydrocolloid adducts and mixtures thereof. The whey protein component may be readily obtained from cheese whey, whey protein concentrate or whey retentate. The fiber generating solution, and the fibers produced therefrom, may include other suitable solubilized edible protein components such as egg white, and/or soy protein as will be discussed in more detail hereinafter. The whey protein should constitute at least about 20 weight percent, and preferably at least about 30 weight percent based on the total weight of solubilized protein component. By "solubilized protein" is meant a protein that is hydrated by existing either in true solution (single phase) or in a stabilized dispersion which at first may appear to be a single phase but after a period of time may separate into two phases. The edible protein polymer component(s) will desirably have an isoelectric point(s) of at least about 3 and preferably in the range of from about 3 to about 6. In this regard, typically whey protein may have an isoelectric point of about 4.3, and dried egg white protein may have an isoelectric point of about 4.7. It is noted that various constituents of the solublized edible protein component may have different isoelectric points. However, it is important that the isoelectric point of the various protein components when complexed with the xanthan gum component form fibrous precipitates in the provision of multiple protein fibers at a preselected reaction pH which is determined by the isoelectric point of the fibrous complex.

Whey protein is soluble over a broad pH range (e.g., 2–12). However, other protein components may require solubilization at a pH of at least about 1 pH unit from their isoelectric points, and preferably at 2 pH units or more from their isoelectric points. By "xanthan gum" is meant the heteropolysaccharide produced by fermenation of the microrganism of the genus Xanthomonas. A discussion of the physical and chemical properties may be found in Industrial Gums, R. L. Whistler, Ed., Academic Press, N.Y. (1973), p. 473.

Xanthan gum in aqueous solution with an appropriate counterion such as sodium is highly negatively charged because its side chains are composed of charged glucuronic acid, mannose and its pyruvate derivative as shown in the following figure:

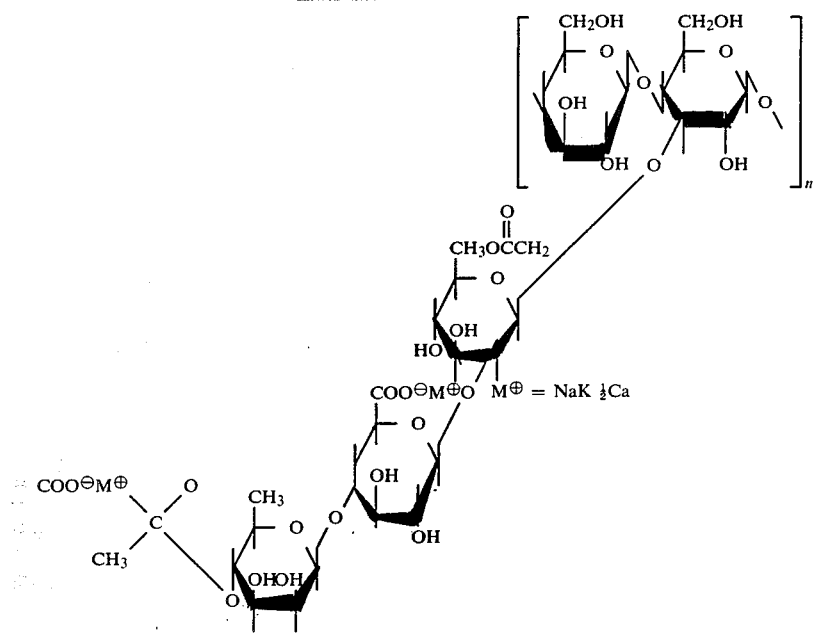

FIG. 1
Structure of xanthan gum

In aqueous solution, the highly charged mutually repelling and relatively bulky side chains, which are regularly disposed along the relatively narrow backbone, are believed to provide the xanthan with a relatively linear structure, which is further believed to be an important factor in the provision of fiber complexes in accordance with the present invention. In the three-dimensional structure of xanthan gum, the charged sugar moieties on the side chains of the gum project away from the gum's backbone in the center and so are not only accessible to proteins for electrostatic interaction, but maintain the relative linearity of the molecules which may be a factor in the fibrous precipitation with the selected protein polymers. By xanthan gum adduct is meant a complex of Xanthan gum with another hydrocolloid.

Xanthan gum forms adducts with other hydrocolloids such as carob gum in which it is believed that the extended linear nature of the xanthan gum in solution is preserved. Desirably, the xanthan gum adducts should comprise at least about 60 weight percent of xanthan gum, based on the total weight of the xanthan gum and the adduct component.

As will be discussed in more detail hereinafter, the protein fiber generating solution may be provided in any suitable manner, as by preparing and subsequently combining a separate whey protein and xanthan gum polymer solutions, and by initially preparing a solution comprising both components. Further in accordance with the present disclosure, the fiber generating solution should contain a solubilized whey protein component and xanthan component in a particular range, and in this regard, the total solubilized protein and xanthan components should be in the range of from about 0.1 weight percent to about 4 weight percent, based on the total weight of the aqeuous fiber generating solution. At lower values, the xanthan gum/whey protein solution mixture precipitates while at higher values, the mixture forms a thick slurry rather than a product having a meat-like fibrous texture.

The aqueous fiber forming solution may further include other components, including other dissolved or suspended whey protein components, flavoring agents, preservatives and hydrocolloids. However, the amount of such components should not exceed the total amount of the specified protein component and the xanthan gum component, and in any event, such additional materials should not be included in amounts which significantly interfere with or prevent fiber formation, as will be discussed in more detail hereinafter.

Further in accordance with the method, the pH of the fiber generating solution is adjusted to a pH at which the components form a complex, which is preferably within about 2 pH units of an optimum isoelectric pH for the desired complex, to form a fibrous whey protein-polysaccharide complex under conditions of mixing of the fiber forming solution.

In this manner, hybrid protein complexes may be formed which have a fibrous-meat like texture. The fiber formation may occur over a range of pH approaching the isoelectric point of the xanthan gum—whey protein complex. In this regard, for example, whey protein-xanthan fiber complex formation, fiber formation may begin near neutral pH and increases as the pH is adjusted to or near to the isoelectric point of the complex, which typically may be in the range of from about 3 to about 6. The fiber formation is spontaneous and does not require the use of spinning equipment. Once the fibers are formed, they may be rendered relatively stable to a range of salt and pH conditions by heat treatment as will be more fully discussed hereinafter. Moreover, the fibrous network synereses (exudes water), which is desirable in the minimization of energy intensive drying steps. The fibers under some conditions may be less dense than the aqueous phase and thus float to the surface for harvesting by skimming the surface of the reaction vessel or draining away the aqueous phase from below such as in a standard cheese vat. The separation of the fibrous protein complexes from the liquid phase, which may contain low molecular weight solutes, effectively removes salts from the protein-complex while at the same time concentrating the whey protein component.

The adjustment of pH to form fibers from the xanthan gum—whey protein mixture may be carried out in a variety of ways. In this regard, the whey protein fiber generating solution may be provided at a pH significantly above the isoelectric point of the protein complex fibers, and subsequently reduced in pH toward the isoelectric point. This pH reduction may be carried out for example by removal of a cationic counterion (e.g., Na+) of the solubilized xanthan gum and/or protein component as by electrodialysis, or by addition of an edible or food grade acid such as hydrochloric acid, phosphoric acid, acetic acid, citric acid, ascorbic acid, carbonic acid or mixtures thereof. The acid appears to protonate both the carboxylate and the amino groups of the whey protein to make the protein less negatively charged so as to link the polymeric chains of the very negatively charged xanthan gum, to form a gum protein complex that has a fibrous network. Adjustment of pH may also be carried out by other appropriate techniques such as by combining an aqueous solution of the protein component at a predetermined pH at which the protein component is solubilized with an aqueous solution of the xanthan gum component at a predetermined pH at which it is solubilized, such that upon combination the resulting solution has a predetermined pH at or near the isoelectric point of the desired whey protein-xanthan gum fibrous complex. In this regard, it will be appreciated that the whey protein component may be provided in aqueous solution in broad ranges of pH at higher and lower pH than its protein isoelectric point(s), and the xanthan gum, which has substantially only anionic carboxylic groups may also be provided in aqueous solution over a broad range of pH. It will also be appreciated that the pH may be adjusted by selective anion removal from a combined solubilized protein and xanthan component solution having low pH, in order to raise the pH to a value approximating the isoelectric point of a desired protein component-xanthan gum fibrous complex, or an edible food grade base, such as sodium hydroxide may be added to such solubilized acidic mixtures.

The fibrous complex reaction is completed or maximized when the gum-protein mixture is adjusted to a pH at which the electrophoretic mobility of a desired gum-protein mixture is substantially zero. Electrophoretic mobility may be measured using conventional analytical instruments such as a System 3000 electrokinetic analyzer manufactured by PenKem, Inc., Bedford Hills, New York.

Because the salt balance affects the electrical charge on the protein and xanthan gum, and because the electrical charge on these polymers affects their interaction with each other, the manipulation of molecular electrokinetic properties is important to the control of the texture of their complex interaction product. By adjusting the pH of the fiber generating solution containing two or more protein and xanthan polyelectrolytes of opposite principal polarity, so that the pH is below the isoelectric point of at least one of the polyelectrolytes, a reaction among the various polyelectrolytes may be carried out, particularly when the net charge of the electrolyte with high pI is positive and that of the other polyelectrolyte is negative. Although it is desirable that opposite net charges be achieved, it is not required. A desirable reaction will take place when the reacting species are like-charged but the charge is reduced to the extent that electrostatic repulsions are overcome in order to allow the reaction to take place.

The isoelectric points of the whey protein component (and other soluble protein components to be included in the fiber system) and the xanthan gum component may have widely different values, for example, the isoelectric point of whey protein may typically be about pH 4.3, while xanthan gum, because it may have substantially only anionic carboxylic acid ionic species, has an effective electrical charge even at pH 1. Whey protein isolate-xanthan complexes will have intermediate isoelectric points, depending upon the relative proportions of each in the complex. Optimal points for hybrid complex formation may be determined by measuring the isoelectric points of desired complexes, which may be carried out by measuring the isoelectric point values separately for the reactants, and adjusting the mixture pH to a value intermediate to the individual pI to form a sample of the desired complex. The pI of the complex thus formed may be measured to determine a desired pH for the complex formation as the control point of the reaction to maximize product yields and achieve the desired fibrous food texture. It will be appreciated, as will be further discussed, that the isoelectric point of a whey protein-xanthan complex may vary depending upon the respective proportions of the components of the complex.

The shape and size of the gum-protein fibers may be controlled by the degree of shear or mixing applied to the fiber forming solution during pH adjustment. For example, long, large and nonordered fibers may be manufactured under conditions of relatively low shear mixing, while short, fine and uniform fibers may be obtained under conditions of relatively high shear mixing during adjustment of the solution pH to the desired fiber-forming value. The rate of pH adjustment, as by acid addition, to form the complexes can vary to a great extent. For example, fibers have been formed by batch addition of the acid to the reaction vessel as well as by slowly metering in the acid. Acid addition may be adjusted to accommodate the reaction scheme.

Complexed xanthan gum/whey protein fibers in accordance with the present disclosure are stable in acidic and neutral media, but may be dissolved in an alkaline solution (i.e., pH 9.0 or higher).

The texture of the gum-protein complex may be controlled by varying the ratio of the gum versus the whey protein. As indicated, the desired xanthan gum to protein weight ratio is within the range between 1:2 and 1:10. If the ratio is higher than 1:2, the complex will be too gummy (i.e., too much gum characteristic), while if the ratio is lower than about 1:10, the complex will lack fibrous texture.

As also indicated, the ionic strength of the fiber-forming solution is an important parameter in respect to fiber formation, and in this regard, should be less than about 1M, and preferably should be in the range of from about 0M to about 0.1M. By "ionic strength" is meant the concentration of mobile ions and is defined by the following equation:

$$\mu = \frac{1}{2} \sum_{i=1}^{n} C_i Z_i^2$$

where $\mu$=ionic strength, $C_i$=molar concentration of ion i and $Z_i$=valency of ion i, and n is the number of different cationic and anionic species. In many cases it is difficult to calculate the ionic strength. The difficulty is alleviated by measuring the specific conductance of the solution. The specific conductance of the solution is the reciprical of its electrical resistance between opposite sides of a cube, one centimeter in each direction. The unit of specific conductance is mho cm$^{-1}$ or ohm$^{-1}$ cm$^{-1}$. The specific conductance of the reaction mixture should be less than about 0.09 mho cm$^{-1}$, and preferably should be in the range of from about 0.0004 to about 0.002 mho per centimeter. Desirably, ranges of conductivity for fiber formation may vary for different systems and component concentrations, and may be determined empirically.

It will also be appreciated that the ionic strength may be reduced, and/or acidification achieved by ion removal from a fiber solution by appropriate means such as electrodialysis and/or ion exchange resin. The ionic strength of the starting materials is important to fiber development, particularly where addition of acidic counterions is utilized to achieve complex formation. In this regard, undiluted fresh whey from cheese making operations may typically have a total solids content of about 6.4 weight percent and about 0.68 weight percent of whey protein (based on the total weight of the whey solution) and may typically have a conductance of about 6000 micro mhos per centimeter at a pH of 6.3. Without dilution, such fresh whey has been found not to form fibers with xanthan gum added thereto upon subsequent acidification. However, by dissolving the xanthan gum in an equal volume of water to form a solution having 0.34 weight percent xanthan gum and a conductivity of about 300 micro mhos per centimeter at a pH of about 6, and combining equal volumes of the whey and xanthan gum solutions to form a mixture having 0.34 weight percent whey protein, 0.17 weight percent xanthan gum and a conductivity of about 3200 micro mhos per centimeter, a solution is provided which readily forms fibers on acidifiction by addition of acid. Similarly, undiluted skim milk has a conductivity of about 5700 micro mhos per centimeter and has been found not to readily form fibers when xanthan gum is added directly thereto and the solution subsequently acidified. However, when the xanthan gum is dissolved in distilled water and combined with skim milk in equal volume amounts to effectively dilute the skim milk on a 1:1 ratio, a fiber complex readily forms upon acidification.

As noted, salt components contributing to ionic strength of the fiber generating solution may be introduced directly, or indirectly as counterions to solublize the protein component and the xanthan gum component and during adjustment of pH of fiber generating solution as by addition of an acid or base to the solution. For example, the formation of xanthan gum/whey protein fibers may be prevented in the presence of 1.0 molar sodium chloride in the fiber generating solution. This indicates that the ions interfere with the electrostatic interaction between the xanthan gum and the whey protein. In contrast, at low concentrations of sodium chloride such as in the range of from about 5 to about 10 millimole concentration in the fiber-forming solution, the gum and the protein may form tougher, less gummy and drier meat-like fibers than those prepared without addition of sodium chloride.

A typical procedure for preparing the fibers of xanthan gum/whey protein complex may be described as follows: (1) provide an aqueous solution of whey protein alone or in combination with other soluble proteins. When using cheese whey, the whey should best be diluted with water such as on a 1:1 volume basis, or electrodialyzed or diafiltered to remove mineral salts, (2) add xanthan gum dissolved form if appropriate) into the protein solution with stirring to form a fiber generating solution comprising 3 weight percent total solids content of a desired ratio of the gum vs. the protein (e.g., 1:2 to 1:10 gum/protein weight ratio), (3) acidify the gum- mixture (with one molar hydrochloric acid or other acid) to the pH where the electrochemical potential of the gum-protein mixture is substantially zero to generate a fibrous gum-protein complex, (4) separate the fibers from the whey and wash them with water, and centrifuge or press them by a cheese press to obtain fibers containing about 80 weight percent moisture, and (5) heat the fibers to a temperature of at least about 70° C. and preferably to the temperature of boiling water (e.g., about 100° C.) to provide a stabilized, meat-like fibrous product. The fibers should comprise at least about 17 weight percent, and preferably about 25 weight percent of milk serum (whey) protein based on the total weight of the solids (non aqueous) content of the fibers.

Having generally described protein fiber manufacture, various aspects of the invention will be further described with respect to methods illustrated in FIG. 1. As shown in FIG. 1, an aqueous whey protein solution such as appropriately diluted cheese whey, whey protein concentrate and/or whey ultrafiltration retentate solution 10 at a whey protein concentration of 0.68 weight percent. Similarly, an xanthan gum solution 12 may be prepared by dissolving Keltrol xanthan gum, a product of Kelco, Inc. in water, at a level of about 0.17 weight percent. The solutions 10, 12 may be combined in desired ratio to provide a fiber generating solution 14 having about 0.34 weight percent whey protein and 0.085 weight percent xanthan gum at a pH of about 5.

The pH, ionic strength, gum/protein ratio, percent total solids, temperature, mode of mixing and stirring and rate of acidification are important factors for synthesizing fibers of xanthan gum-protein complexes, utilizing the fiber generating solution 14. Such pH adjustment may be carried out by addition of hydrochloric acid to protonate the protein component so that the repulsion between the two polymers can be minimized, and so that electrostatic interaction can take place to provide fibers 16 and a whey phase 18 which may be separated by appropriate means.

The weight percent total solids of the fiber generating gum/protein solution 14 in water may typically be varied within the range of from about 0.1 weight percent to about 4 weight percent by weight. If the weight percent of total dissolved xanthan-protein solids is lower than about 0.1 weight percent, the complex may precipitate without proper fiber formation. On the other hand, if the weight percent of such dissolved solids is higher than about 4 percent, the gum-protein mixture may form a thick slurry, again without proper fiber formation. The water content of the fiber generating solution (as well as the ionic strength) is important for the complexed polymers to form a fibrous network.

The temperature at which the protein-gum interaction is carried out is also important. A high temperature is not generally desired for forming the fibers of the xanthan gum-whey protein complex. Softer and finer fibers may be obtained when the gum and the protein are heated to or above 70° C. before the two polymers were mixed and acidified. It may be that higher temperatures tend to change the conformation of the xanthan molecule from a rigid rod to a random coil, thereby adversely affecting fiber formation, but in any event, fiber formation should be carried out at a temperature of from about 4° C. to about 100° C.

The mode of mixing or agitation of the fiber-forming solution while carrying out the pH adjustment is also an important factor in formation of fibers. Different types of blades and/or different speeds of stirring may be utilized to provide different shapes and sizes of fibers. For example, large, long fibers may be obtained by using a Hobart blender at a slow speed (e.g., 90 rpm) while acidifying the fiber-forming solution. On the other hand, fine, short fibers may be obtained while stirring the gum-protein mixture in a Waring blender at a medium speed upon acidification.

The whey 18 separated from the fiber composition 16 may contain inorganic salts resulting from the pH adjustment step, and may contain some unreacted xanthan gum or other components. The inorganic salts may be removed, at least in part by appropriate means such as through the use of selectively permeable membranes, electrodialysis and/or ion exchange resins, to provide a deionized whey 22, which may be utilized in the provision of the protein and gum solutions 10, 12. The fiber composition product 20 has a distinct fibrous character.

The electophoretic mobility of whey, xanthan gum and the whey protein-xanthan gum complex was determined by electrokinetic analyzer (System 3000 Electrokinetic Analyzer of Pen Kem, Inc.) at 25° C. by diluting an aliquot mixture of whey, xanthan gum or mixture thereof 20 fold with water and measuring the electrophoretic mobilities of these solutions as a function of pH (adjusted with dilute hydrochloric acid or sodium hydroxide solution).

Figure 2:
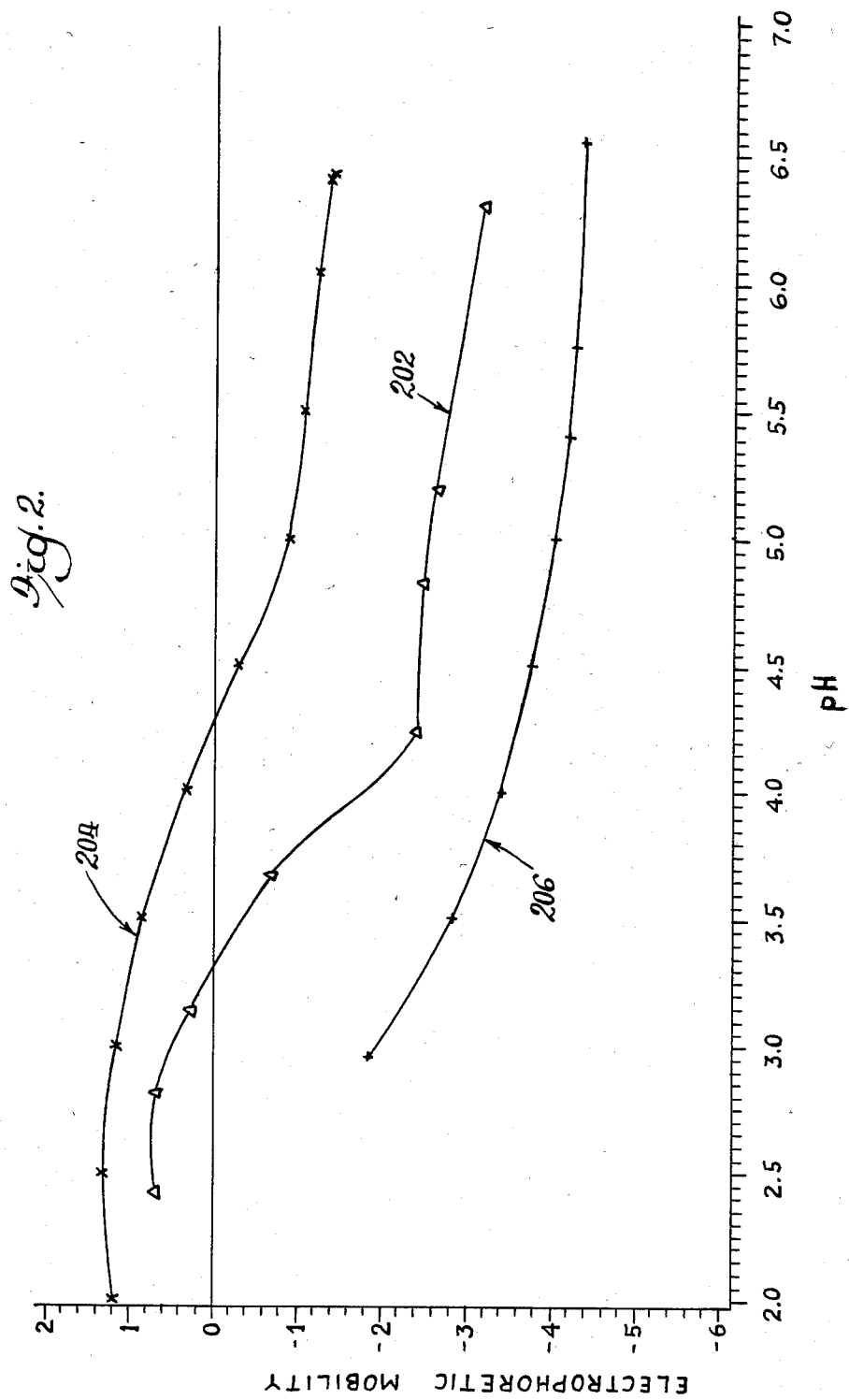
FIG. 2 is an electrophoretic mobility versus pH curve of an embodiment of fibrous xanthan—whey protein complex together with corresponding mobility curves for the fiber components.

As shown in FIG. 2, the electrophoretic mobility (in units of $1 \times 10^{-8}$ meters squared per volt per second) for whey protein-xanthan gum complex 202 is intermediate the corresponding curves for cheese whey 204 and xanthan gum 206. The respective isoelectric points are the pH values at zero mobility.

Figure 3:
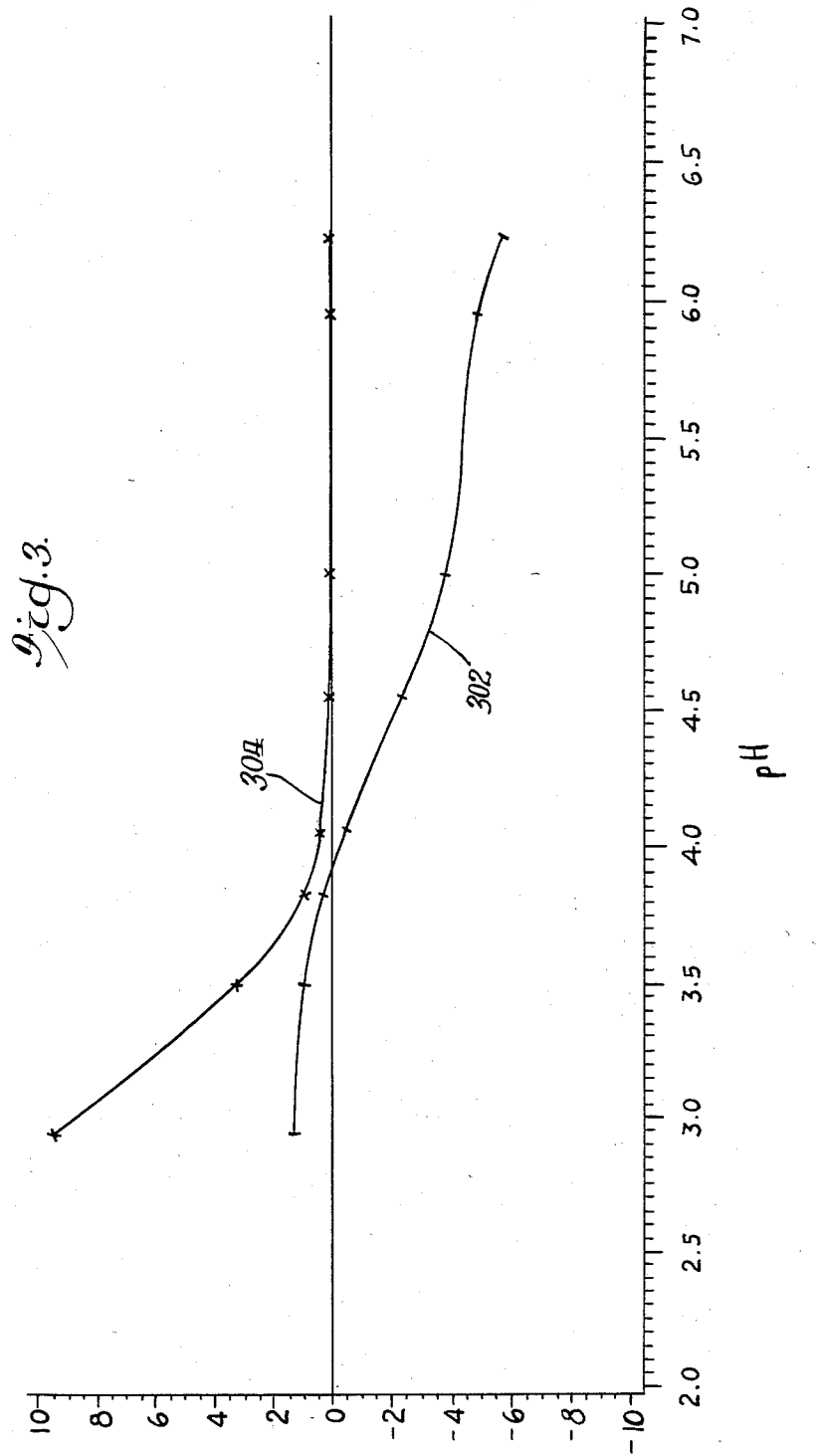
FIG. 3 is an electrophoretic mobility-pH histogram and specific conductance-pH curve of a xanthan gum-soy protein isolate-whey protein concentrate ternary complex.

Similarly measured and illustrated in FIG. 3 is an electrophoretic mobility-pH curve 302 for a xanthan gum-soy protein isolate-whey protein concentrate (1:3:3 weight ratio) ternary complex, together with a specific conductance—pH curve 304 for the diluted complex. Mobility units are $1 \times 10^{-8}$ meters squared per volt per second, and specific conductance units are $1 \times 10^{+2}$ micromhos per centimeter.

Although the method of FIG. 1 has been particularly described with respect to whey protein—xanthan gum complex fibers, other water soluble proteins may also be included in the whey protein complexes to form meat-like fibers. In this regard, for example, casein such as provided by skim milk powder or as sodium caseinate, vegetable proteins such as peanut protein isolate or soy protein isolate, and egg protein, such as provided by egg whites, may be utilized in combination with the whey protein as the solubilized protein component to form fibrous hybrid protein complexes which are relatively bland and differ in color and texture.

A desirable feature of the present disclosure is that several proteins may be utilized with whey protein and xanthan gum to form multiple protein-gum complexes. For example, the fibrous ternary complexes of soy—xanthan gum—whey protein isolate may be provided in which the ratio of the protein components is varied to provide desired fibrous products having a corresponding variety of characteristics. As also indicated, the solubilized xanthan gum component may comprise an xanthan gum adduct such as by fibrous hybrid protein complexes by mixing xanthan gum with other gums such as carob gum. Desirably, the different gums are first blended together and are subsequently blended with a protein to provide a fiber-forming aqueous solution. The multiple gums may be combined with a solubilized whey protein component in the desired weight ratio to form a fiber generating solution of the components, which may then be acidified under moderate shear conditions to generate a multiple gum—protein complex having a meat-like fibrous texture. Such xanthan—polysaccharide blends may be selected not only for reasons of economy to minimize the cost of the xanthan gum component of the resulting product, but also to vary the texture of the fibers. Similarly, fibrous multiple gum—multiple protein complex fibers including whey protein may be prepared by using the appropriate starting components.

Utilization of various protein components and component blends permits manufacture of synthetic meat-like protein fibers which differ in color, firmness and flavor depending on components and processing variations. The fiber complexes of vegetable proteins such as soy isolate, with whey protein, are functionally nutritious and may substantially completely suppress undesirable vegetable protein flavor components.

Upon formation, the complexed xanthan gum-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 60 to about 80 weight percent moisture, and typically about 65 percent by weight moisture. The press dried fibers may be flavored by immersing them in a suitable favoring agent such as lobster, crab, chicken or beef extract to obtain desired, chewable meat-like products having meat simulating flavor and texture.

At acidic pH, the basic groups of the protein, namely the lysine, arginine and histidine residues are protonated and positively charged. In contrast, the xanthan gum is still negatively charged at the reaction or interaction pH. As a result, the gum and the protein interact spontaneously by electrostatic attraction which is controlled by the pH, the ionic strength, the isoelectric point of the protein and the pKa of the gum.

The fibers of xanthan gum/whey protein complex tend to soften and become slightly slimy above pH 5.5 perhaps because the gum-protein complex is very negatively charged and has more charge characteristics of xanthan gum at or above pH 5.5. An important feature in accordance with the present invention is that the softening and the sliminess may be prevented if the fibers are heated to an elevated temperature such as by boiling in water at the isoelectric point of the gum-protein complex for a few minutes. It appears that the treatment denatures the protein or the complex as a whole so as to prevent the dissociation and/or dissolution of the gum-protein complex. Such heat treatment may liberate some flavor component characteristic of the starting protein, but this can be corrected or minimized by boiling the fibers in the presence of a thermostable meat base or other flavoring agents.

As indicated, fibers of xanthan gum-whey protein complex may soften when flavored with flavoring agents such as conventional meat base flavoring agents. Since the fiber formation of xanthan gum and the protein is mainly governed by electrostatic attraction force, the pH and ionic strength in the flavoring agents may cause such softening, and in this regard, flavoring agents tend to contain large amounts of salts or have a pH which is adverse to the integrity of the fibers.

Because the complexes of xanthan gum and the whey protein component as initially formed in aqueous solution are believed to be primarily mainly electrostatic and therefore sensitive to pH and ionic strength, methods for stabilizing the bond between the two biopolymers, so that the complex was stable under various processing conditions utilized in manufacture or storage of various food products are important for the development and commercial utilization of the synthetic fibers. Fibers prepared in accordance with the present disclosure may be produced which are relatively bland, firm, white and chewy. These edible fiber compositions may be flavored to prepare meat simulating compositions such as simulated chicken, pork, crab and lobster meat, which in turn may be utilized to prepare food dishes utilizing the respective meats, such as crab and lobster salads. However, such fibers may tend to become soft and mushy or even lose their fibrous structure when they were flavored with various flavoring agents, particularly including commercial flavoring agents that contain salt (NaCl). In accordance with the present disclosure, methods are provided for stabilizing the fiber complex so as to prevent the fibers from softening under various processing conditions.

Heat treatment of the protein-gum complex fibers not only results in stabilization of the fibers to retain their firmness, but may also be utilized to pasteurize the fibers. In addition, by varying the temperature and the time of heating, different degrees of firmness and stability of the fibers can be obtained, as desired.

The moisture content of the drain-dried fibers will generally be in the range of 75 to about 90 percent, such as about 80%, and it is desirable to add flavoring agents when the fibers contain this amount of moisture. However, the fibers, as precipitated, or after heat stabilization may be substantially reduced in moisture content to provide a low moisture fiber product (e.g., less than about 30 weight percent water) which retains its fiber integrity. These fibers may be rehydrated to obtain a texture that is similar to that of the drain-dried ones.

The moisture content of pressed fibers will generally be in the range of from about 60 to about 80 weight percent, such as about 65%. Fiber compositions having feduced moisture content, such as less than about 25 weight percent, may be provided which have longer shelf life and easier handling for shipping and storage. However, the fibers may become fragile and brittle at very low moisture content, for example, when lypholized to contain less than about 4 weight percent moisture. As a result, a suitable amount of moisture content may be retained in order to maintain fiber firmness and structural integrity.

As indicated, the xanthan-protein fiber compositions in accordance with the present invention may be flavored to simulate the flavor of a selected natural meat composition, particularly after heat stabilization of the fiber complex.

The fibers of protein-xanthan gum complex may also be flavored by blending melted processed cheese with the fibrous complex. This provides a product having a meat-like, chewy texture with a cheese flavor. Another type of product can be prepared by mixing cubes or slices of cheese with meat-flavored fibers to obtain a cheeseburger-type of pattie.

The flavored and pressed patties may be heat-set by raising the temperature of the blended fiber and binder mixture to or near the boiling temperature of water. Such heating may be accomplished by means of conventional hot air, radiation, conduction or microwave ovens. For example, a pattie may be heat set by cooking in a 700 watt microwave oven for 1 minute for every 200 grams of pattie. The heating temperature and time can be varied depending on the physiochemical properties of the fibers as well as the desired texture and appearance of the pattie. Heat-setting is not required for all applications of pressed fibers. For example, press patties may be breaded and deep fried directly without the heat-setting step.

Fibers of whey protein—xanthan gum binary or whey-soy protein-xanthan gum ternary complexes were added into boiling water (approximtely 3 times the weight of fibers) and boiled for 5 minute. Temperature and time of the heat treatment can be varied depending on how firm a fiber is required. After boiling, the fibers were immediately filtered by using a 1×1 mm sieve and washed with cold tap water (approximately 4 times the weight of fibers). The volume of the water used for washing can be varied depending on how much foreign matter is associated with the fibers and on how tightly the foreign material is entrapped and bound. The boiled and washed fibers were drain-dried and ready for the preparation of meat analogs and seafood products. The fibers normally contain about 80% moisture, which can be reduced by centrifugation or pressing.

As indicated, protein in cheese whey upon appropriate ionic strength adjustment has been found to readily form a complex with xanthan gum (FIG. 2). As a result, the whey protein may be recovered by the protein-polysaccharide complex reaction using xanthan gum. Adjustment of the ionic strength of cheese whey such as by dilution with water before addition of xanthan gum is necessary otherwise the xanthan-whey mixture forms gel-like material rather than fibers. Without dilution, the xanthan-whey mixture may be too concentrated to allow the polysaccharide and the whey protein molecules to reorient and align themselves to form fibers at the indicated ionic concentration and/or that the ionic strength of the mixture was too high to allow the ionic bonding between the two biopolymers to take place.

After acidification and stirring, the fibers may be skimmed, drain-dried and pressed to form a fibrous mass with a clear supernatant. The protein remaining in the supernatant may be quantified by Lowry's method, with the percent recovery being calculated from the ratio of the protein remaining in the supernatant to the protein in the cheese whey. The protein recovery was the highest when 0.68% (w/v) xanthan gum was dispersed in the cheese whey with acidification and stirring (Table 1). Although 0.68% (w/v) xanthan gum gave a highest yield, 0.34% (w/v) xanthan yielded firmer and less gummy fibers with reasonably good yield:

TABLE 1

Percent Recovery of Whey Proteins By Complexing with Xanthan Gum

| % Xanthan Gum Cheese Whey | SUPERNATE Absorbance 500 nm | Protein Con. (mg/ml) | % Recovery |
|---|---|---|---|
| 0 | 0.624 | 8.8 | — |
| 0.68 | 0.102 | 1.1 | 87.5 |
| 0.34 | 0.132 | 1.5 | 83.0 |
| 0.17 | 0.192 | 2.0 | 77.3 |

The formation of whey protein fibers from a fresh cheese whey was made by dispersing xanthan gum in the whey which was then acidified to pH 3.0 with 1 molar hydrochloric acid. The percent recovery of the whey proteins was determined by measuring the protein contents in the supernates of the whey (treated with and without xanthan gum and then centrifuged) by using Lowry's protein quantitation method, which may have limited accuracy in the system.

In the work reported in Table 1, the percent xanthan gum for the fresh whey was so chosen by assuming the protein content in the fresh whey to be 0.68%. The supernates were obtained by centrifuging the cheese whey (treated with and without xanthan gum) at 10,000 g, pH 3.0 and 15° C. for 20 minutes. The absorbance of the supernate in the Lowry's reagent reported in Table 1 was measured on a Varian spectrophotometer at 500 nm wavelength and 25° C., and the protein concentration was calculated from the corresponding absorbance by using bovine serum albumin as a protein reference. 0.1% xanthan gum in the Lowry's reagent gave an insignificant absorbance, 0.024. The percent recovery reported in Table 1 was calculated from the ratios of the protein concentrations of the supernates of the wheys treated versus nontreated with xanthan gum.

The color of the fibers of whey protein-xanthan gum or whey protein-soy isolate-xanthan gum complexes was determined on a Gardner XL 805 Colorimeter. The flavor and the texture of the fibers were evaluated subjectively.

hydrate was calculated by "difference" unless otherwise specified, and the lactose composition was determined by using high performance liquid and gas chromatography.

The fibrous soy-whey protein-xanthan gum ternary complex reported in Table 2 was prepared from three parts soy isolate, 3 parts whey protein and 1 part xanthan gum, by weight. The xanthan gum/total protein ratio determined by Lowry's method and Phenol-sulfuric acid method (for quantifying protein and carbohydrate, respectively) was 1/7. Based on the gel electrophoresis, 45.9% of the total protein is from whey. The analytical values of the lypholized supernatant are moisure, 8.7%; protein, 48% (7.66×(6.25+6.38)/2).

The fibrous soy protein-xanthan gum complex reported in Table 2 was prepared from 6 parts soy isolate and 1 part xanthan gum, by weight, and the fibrous whey protein-xanthan gum complex was prepared from 0.34% (w/v) xanthan gum dissolved in fresh cheese whey with acidification and stirring. Since the lactose composition is 6%, the calculated xanthan gum will be $(35-6)\% = 29\%$. Lactic acid is less than 0.01 weight percent on a dry weight basis if present. The boiled whey protein/gum fibers were boiled for 5 minutes, washed, drain dried and lypholyzed.

In the work reported in Table 2, the supernatant was obtained from the complex reaction of the fresh whey and xanthan gum after the fibrous whey protein-xanthan gum complex was isolated. 76.7% of the calculated carbohydrate (79.4%) was lactose. The lactic acid was 0.42% (percentages herein, unless otherwise indicated, are weight percent).

Gel electrophoresis in combination with Kjeldahl nitrogen analysis was found to be useful for identifying and quantifying different proteins in the fibers. Soy and whey proteins of the ternary complex fibers were separated on the SDS (sodium dodoecyl sulfate) and the ratio of the soy/whey protein was calculated from the total peak intensity differences of the gel scans (FIG. 4) of the soy isolate, the whey protein concentrate and the xanthan-soy-whey protein ternary complex. In this regard, illustrated in FIG. 4 are electrophoretic gel scans of a fiber of xanthan gum-soy protein isolate whey protein (1:3:3) ternary complex 402, soy protein isolate 404, and whey protein isolate 406. Major protein compo-

TABLE 2

COMPOSITION OF FIBERS

| Sample | Protein Nitrogen value (× conversion factor) | Fat | Moisture | Ash | Lactose | Carbohydrate (calcd) |
|---|---|---|---|---|---|---|
| Fibrous whey protein - xanthan gum complex | 56 (8.78 × 6.38) | 4.9 | 3.2 | 1.2 | 6 | 35 |
| Boiled, fibrous whey protein - xanthan qum complex | 57 (8.87 × 6.38) | | | | <0.1 | |
| Supernatant of the xanthan qum whey complex reaction | 6.8 (1.07 × 6.38) | 0.19 | 4.0 | 9.6 | 77 | 79 |
| Spray dried cheese whey | 12 (1.89 × 6.38) | 0.5 | 4.5 | 8 | 73 | 75 |
| Fibrous soy-whey protein - xanthan qum ternary | 78 [12.27 × (6.25 + 6.38)/2] | 5.2 | 3.8 | 1.2 | | 12 |
| Fibrous soy protein - xanthan qum complex | 81 (12.92 × 6.25) | 2.0 | 1.2 | 1.4 | | 14 |

In the work reported in Table 2, all of the samples were lypholyzed except for the spray dried cheese whey, and the protein composition was calculated based on Kjeldahl nitrogen analysis. The percent carbonents of the whey protein concentrate were beta-lactoglobulin and alpha-lactalbumin, which had molecular weights of 18,400 and 13,400, respectively, while the soy protein had larger molecular weight fractions. The bands above 18,400 dalton corresponded to the soy protein fractions except that a band at 68,000 corresponded to bovine serum albumin. Since the total protein in the fibers was known based on the Kjeldahl nitrogen analysis, the composition of each protein in the fibers was then calculated. For example, fibers prepared from 1:3:3 xanthan gum/whey protein concentrate/soy isolate gave 46/54 whey/soy protein ratio based on the total peak intensity differences of the gel scans (FIG. 4). Because the total protein in the fibers based on the Kjeldahl nitrogen analysis was 77.5% while assuming the conversion factor for the fibers protein was (6.25+6.38)/2, the compositions of whey and soy proteins in the fibers was calculated to be 35.6% and 41.9%, respectively.

Proteins used for preparing fibrous protein-xanthan gum complex often contain free carbohydrate, or are glycoproteins themselves in which the carbohydrates are covalently bound to the proteins. As a result, it is difficult to know exactly how much xanthan gum and how much carbohydrate are in the fiber system by regular analytical "difference" methods or the common carbohydrate method.

As indicated, other proteins may be used in combination with whey protein to provide useful edible like products. Fibers of soy-whey protein-xanthan gum (3:3:1 weight ratio) ternary complex gave a more desirable flavor than those of soy protein-xanthan gum (6:1) binary complex, those of whey protein-xanthan gum (6:1) binary complex, or the fiber mixture of the two binary complexes because the dairy and the beany flavors existed in the xanthan-whey protein and the xanthan-soy protein binary complexes, respectively, and in the fiber mixture, but were not noticeable in the ternary complex. The ternary complex was also firmer than the xanthan-whey protein binary complex and whiter (Table 3) than the corresponding xanthan-soy protein binary complex:

TABLE 3

| Fibers | Color Parameter | | |
|---|---|---|---|
| | L | A | B |
| whey protein-xanthan gum complex | 85.25 | −0.80 | +8.88 |
| wpc-xanthan gum (6:1) complex | 86.44 | −0.82 | +9.98 |
| wpc-soy protein-xanthan gum (3:3:1) ternary complex | 83.65 | +0.11 | +10.01 |
| soy protein-xanthan gum (6:1) complex | 80.3 | +0.62 | +9.71 |

In the work reported in Table 3, the whey protein-xanthan fibers were prepared from a fresh whey while the WPC (whey protein concentrate)-xanthan (6:1 weight ratio) fibers were prepared from a whey protein concentrate that contains 84% protein. These fibers were boiled and drain-dried. They were broken into smaller pieces and pressed against the bottom of the Agtron cups and read on a Gardner XL 805 colorimeter.

In Table 3, L value=0=pure black, 100=pure white; A value=positive values are red while negative values are green; B value=positive values are yellow while negative values are blue.

Fibers of whey protein-xanthan gum complex are soft but white (Table 3). They become very firm after boiling and are relatively bland with a slight dairy flavor taste. They can be flavored with various flavoring agents to obtain different meat analogs and seafood products.

Gel electrophoresis suggests that the ternary complex formation of the dairy, nondairy protein and polysaccharide exhibits a synergetic effect on the overall functionality (e.g., color, flavor and texture) of the proteins [Table 3]. A similar synergetic effect was obtained from the ternary complex of egg albumin, soy protein and xanthan gum as described in the copending application referred to hereinabove.

The fibers of whey protein-xanthan gum or whey-soy protein-xanthan gum complexes are substantially firmer after heat treatment such as boiling. The lactose composition of the protein-polysaccharide complex prepared from cheese whey and xanthan gum was reduced from 6% to less than 0.1% by boiling (Table 2). This shows that the heat treatment not only enhances the firmness of the fibers but also efficiently separates the lactose from the complex. The result also suggests that the lactose is physically entrapped to the fiber network upon the complex formation.

Fibers of whey protein-xanthan gum complex and whey-soy protein-xanthan gum ternary complex may be flavored with suitable flavoring agents to obtain different meat analogs and seafood products. The corresponding nonfibrous protein-xanthan gum complexes could be used for other food applications. Xanthan gum in the nonfibrous complex need not be removed and could serve as a stabilizer for the dairy and nondairy proteins. One application of the fibrous dairy-nondairy-polysaccharide ternary complex was made by flavoring the ternary complex fibers with Haarmann and Reimer's "Taste of Chicken" and Henningsen's "Chicken Fat", pressed and heat-set to obtain protein-polysaccharide fiber based chicken patties, which had a good meat texture and acceptable flavor.

The boiled, washed and drain-dried fibers of a xanthan-protein complex were blended with 2% (w/w, flavoring agent vs. drain-dried fibers) Haarmann and Reimer's "Taste of Chicken" (R-65986) in a Hobart blender at the slowest speed for 30 seconds. To the flavored fibers were then added 5% (w/w) Kraft's dried egg whites. The mixture was stirred in the blender for 30 seconds. 5% (w/w Henningsen's rendered chicken fat was blended with the mixture in the blender for 30 seconds or until all the fat was dispersed through the system. The mixture was allowed to stand at room temperature for 30 minutes, pressed on a cheese press at 28 psi (pounds per square inch) for 30 minutes and cooked in a microwave oven (at "cook" setting) for 1 minute for every 200 g. patty. The patty is ready to serve as is or it can be diced into cubes and stir-fried or boiled with vegetables to prepare various dishes.

While the present invention has been particularly described with respect to various specific embodiments, it will be appreciated that modifications, adaptations and alterations will become apparent based on the present disclosure and are intended to be included within the scope of the following claims.

What is claimed is:

1. A method for manufacturing edible protein fibers comprising the steps of providing an aqueous protein fiber generating solution comprising a solubilized edible protein component comprising at least about 20 weight percent of dairy whey protein based on the total weight of solubilized protein, and a solubilized xanthan gum hydrocolloid component selected from the group consisting of xanthan gum, xanthan gas/hydrocolloid adducts and mixtures thereof, the weight ratio of said xanthan gum to said protein component being in the range of from about 1:4 to about 1:10, and wherein the total weight of said solubilized edible protein component and said solubilized xanthan gum hydrocolloid component is in the range of from about 0.1 to about 4 weight percent, based on the total weight of said aqueous protein fiber generating solution, adjusting the pH of the fiber generating solution to the isoelectric point of a xanthan-protein complex while mixing said fiber generating solution to provide xanthan-protein fibers and a whey solution, and separating the fibers from the whey solution.

2. A method in accordance with claim 1 wherein the formed fibers have a pH of at least about 3.

3. A method in accordance with claim 1 wherein said pH adjustment is carried out at a temperature in the range of from about 4° C. to about 100° C. at an ionic strength of less than about 1 molar.

4. A method in accordance with claim 1 wherein said fibers are stabilized by heating to a temperature of at least about 70° C.

5. A method in accordance with claim 4 wherein said fibers are blended with a salt-containing flavoring agent to provide a flavored meat simulating composition comprising at least about 1 weight percent of sodium chloride which retains its fiber integrity.

6. A method in accordance with claim 1 wherein said fibers having a hardness of at least about 100 Kg at a water content of at least about 50 weight percent.

7. An edible protein complex comprising xanthan gum and whey protein in fiber form as prepared by claim 1.

8. A simulated meat composition comprising a complex of xanthan gum and whey protein fibers as prepared in claim 1, a binding agent and a flavoring agent.

9. A method in accordance with claim 1 wherein said pH is adjusted to a value in the range of from about 3 to about 6, and wherein said whey protein is provided as a diluted natural cheese whey solution, a whey protein concentrate solution, a whey ultrafiltration retentate solution, or mixtures thereof.

10. A method in accordance with claim 1 wherein the total solids content of the fiber generating solution is less than about twice the total weight percentage of said protein component and said xanthan gum.

11. An edible protein complex in fiber from in accordance with claim 7 wherein said fibers have a moisture content in the range of from about 60 to about 80 percent weight.

* * * * *